No. 762,803. PATENTED JUNE 14, 1904.
A. J. B. M. COLLETAS.
ELECTRIC ACCUMULATOR.
APPLICATION FILED SEPT. 12, 1901. RENEWED APR. 22, 1904.
NO MODEL.
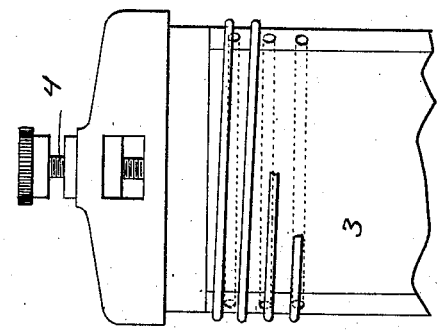
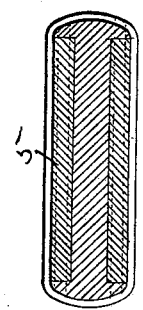
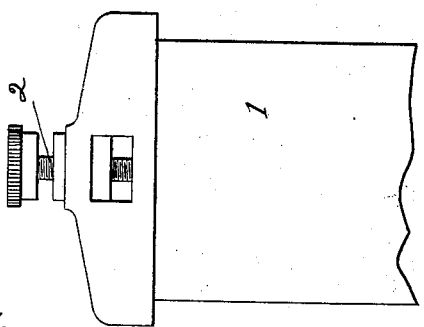
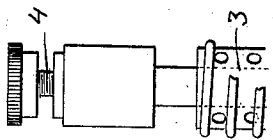
WITNESSES:
Isabella Waldron
Adelaide Claire Gleason
INVENTOR:
Alfred Jean Baptiste Maxime Colletas
BY Richards & Co
ATTORNEYS No. 762,803. Patented June 14, 1904.

UNITED STATES PATENT OFFICE.

ALFRED JEAN BAPTISTE MAXIME COLLETAS, OF PARIS, FRANCE.

ELECTRICAL ACCUMULATOR.

SPECIFICATION forming part of Letters Patent No. 762,803, dated June 14, 1904.

Application filed September 12, 1901. Renewed April 22, 1904. Serial No. 204,423. (No model.)

*To all whom it may concern:*

Be it known that I, ALFRED JEAN BAPTISTE MAXIME COLLETAS, a citizen of the Republic of France, and a resident of Paris, France, have invented certain new and useful Improvements in Secondary Batteries, of which the following is a specification.

This invention relates to a new battery of very great power and very slight weight. The basis of this battery is hydrid of copper, a well-known compound of reddish-brown color which evolves hydrogen in pure water and is decomposed at a temperature of from 55° centigrade. It is an endothermic compound with the formula $Cu_2H_2$. This hydrid is easily obtained by electrolyzing with an electromotive force of at least 2.5 volts and current of over one ampere per square decimeter of cathode an aqueous solution of sulfate of copper at its highest degree of conductivity (seventeen per cent.) strongly acidulated with sulfuric acid.

The annexed drawings represent one cell of a battery constructed according to this invention, Figure I being an elevation of the cathode, Fig. II an elevation of the anode, Fig. III a side view of the latter, and Fig. IV a horizontal section of same.

1 is the cathode, which is made of agglomerated retort-carbon, preferably associated with metallic arsenic, or of any analogous porous material which is electrically conductive, but unattackable by sulfuric acid. Any shape can be used; but that shown in the drawings is preferred.

2 is the terminal screw.

The anode comprises a support 3, of agglomerated carbon, preferably of double-T shape, carrying at its upper part the terminal 4. 5 is a layer of plumbiferous paste cast in the space formed by the web and sides of the double T. This plumbiferous paste is obtained by mixing either red lead or protoxid of lead or chlorid of lead or the like with water containing one-twentieth of liquid gelatin, white of eggs, dextrine, liquid starch, or vegetable gums to a firm and plastic consistence. The plastic paste could be obtained by mixing the material with pure water; but I prefer the above-described solution, for the reason that under electrolytic action the sulfuric acid rapidly converts these materials into soluble products, which leave cavities in their places, and thus considerably increase the porosity. 6 is a wire of lead would round the whole and forming a casing which holds the paste 5 in place. I mention lead as forming this casing; but any other suitable material can be used. If the layer of paste is more than four millimeters in thickness, I bore through it ducts of suitable size—about one millimeter in diameter and, say, half a centimeter apart—so as to increase the surface without increasing the resistance. The electrodes thus formed are placed, as usual, in a cell made of insulating material and containing an aqueous solution of sulfate of copper strongly acidulated with sulfuric acid. A current is then passed through having 2.5 volts at least and exceeding one ampere per square decimeter of cathode. Under the action of this current the hydrogen is carried to the cathode and takes with it the copper, which is deposited on the cathode in the form of copper hydrid, ($Cu_2H_2$,) whereas the oxygen accumulates at the anode and there converts the lead into dioxid of lead, ($PbO_2$.) When the accumulator has been charged and the circuit is closed, the sulfuric acid attacks the copper hydrid, forms sulfate of copper, and liberates the hydrogen. At the anode the dioxid of lead is converted into oxid of lead, and the oxygen evolved combines with the hydrogen evolved at the cathode and forms water. The following is the equation:

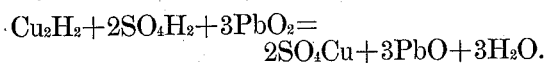
$$Cu_2H_2 + 2SO_4H_2 + 3PbO_2 = 2SO_4Cu + 3PbO + 3H_2O.$$

As will be seen from the above, my invention applies equally to primary batteries and to secondary batteries. If I place in a bath of sulfuric acid of suitable strength an electrode loaded with copper hydrid and one loaded with peroxid of lead, the two said materials having been produced outside the battery, it is obvious that as soon as the circuit is made the acid will attack the hydrid, and a current will be set up, the battery thus working as a voltaic or primary battery.

It will be understood that I may use the hydrid of copper and the plumbiferous paste together or single.

Having now particularly described and ascertained the nature of my said invention and in what manner the same is to be performed, I declare that what I claim is—

1. A battery having a negative-pole electrode containing hydrid of copper.

2. A battery having a negative-pole electrode of porous material electrically conductive but unattackable by sulfuric acid, said electrode containing hydrid of copper, in combination with a bath of sulfuric acid.

In witness whereof I have hereunto set my hand in presence of two witnesses.

ALFRED JEAN BAPTISTE MAXIME COLLETAS.

Witnesses:
J. ALLISON BOWEN,
AUGUSTE BAUVEUX.